United States Patent [19]

Divisi

[11] Patent Number: 4,921,072
[45] Date of Patent: May 1, 1990

[54] MODULAR PROGRESSIVE HYDRAULIC DISTRIBUTOR FOR LUBRICATION SYSTEMS

[75] Inventor: Gualtiero Divisi, Via Massimiano, Italy

[73] Assignee: Dropsa S.p.A., Italy

[21] Appl. No.: 257,436

[22] Filed: Oct. 13, 1988

[30] Foreign Application Priority Data

Oct. 19, 1987 [IT] Italy ................................. 22328 A/87

[51] Int. Cl.[5] ............................................. F16N 27/00
[52] U.S. Cl. ..................................... 184/7.4; 137/119; 137/884
[58] Field of Search .................... 184/7.4; 137/624.14, 137/884, 119

[56] References Cited

U.S. PATENT DOCUMENTS 4,186,821  2/1980  Wegmann .............................. 184/7.4
4,312,425  1/1982  Snow et al. ........................... 184/7.4
4,502,567  3/1985  Karcher .............................. 137/624.14

Primary Examiner—Carroll B. Dority
Attorney, Agent, or Firm—Steinberg & Raskin

[57] ABSTRACT

A progressive hydraulic distributor which comprises a control block containing three pistons disposed at the vertices of an ideal triangle and ducting for the lubricant fluid, and is removably supported on a second block comprising only ducts with a purely distributing function. The connections between the ducts of the second block and the ducting of the first block are made by way of several ports, and in particular by passage ports comprising two distinct holes which are in mutual communication but can be separated from each other by O-rings, these connections being such as to enable the output fluid flow rate to be varied without disconnecting any pipe connected to a user.

7 Claims, 3 Drawing Sheets

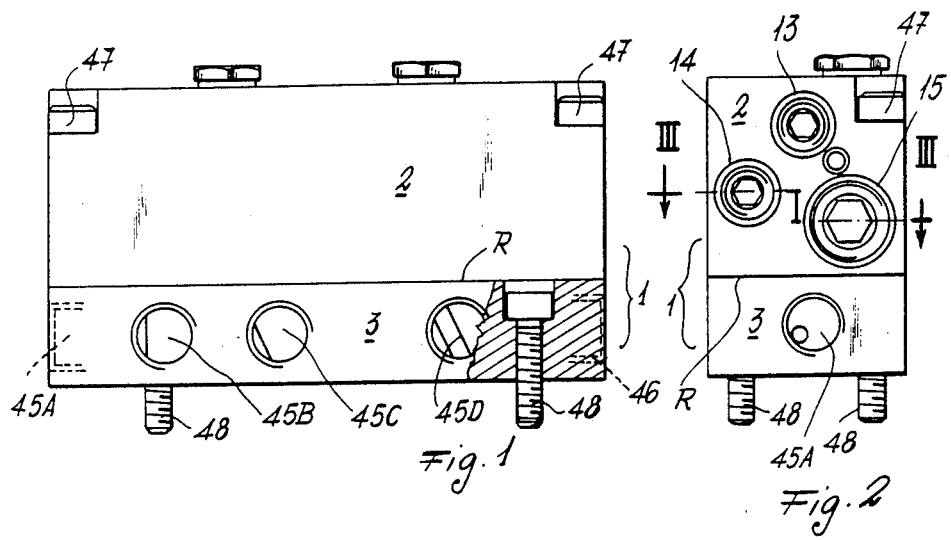
Fig. 1
Fig. 2
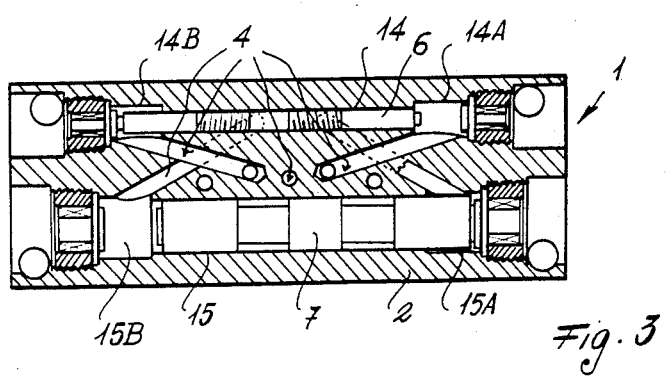
Fig. 3

4,921,072

MODULAR PROGRESSIVE HYDRAULIC DISTRIBUTOR FOR LUBRICATION SYSTEMS

BACKGROUND OF THE INVENTION

1. Field of the Invention

This invention relates to a progressive hydraulic distributor for lubrication systems, comprising a section for distributing the lubricant fluid originating from a fluid source to one or more users and a control section containing ducting and collar pistons, the movement of which delivers the lubricant to the user or users.

2. Description of the Related Art

In commercial distributors the distribution and control sections are each composed of a number of blocks. The blocks are connected together in a sealed manner so that they cannot be removed or changed, the blocks of the distribution section comprising ducts and inlet and outlet ports, and the blocks of the control section comprising a collar piston and further ducts.

The pistons are located in cylindrical chambers and comprise two depressed sections extending along their axis, these therefore being delimited by three collars. The end portions of these chambers are connected alternately to the pressurised lubricant fluid source and to a user, so that the pressurised fluid present in one end portion drives the piston, to feed the lubricant fluid contained in the other cylindrical chamber end portion to the user.

These distributors allow several users to be lubricated, but have the serious drawback of being of considerable size to an extent which sometimes makes it difficult to position the distributor on a production or user machine.

A further no less serious drawback of known progressive hydraulic distributors is that adjusting the output flows is inconvenient and relatively complicated.

SUMMARY OF THE INVENTION

An object of the present invention is therefore to provide a small-dimension and thus more compact and less bulky progressive hydraulic distributor which is of less complicated construction than known distributors and allows very simple adjustment of output flow without having to disconnect any pipes. The result is therefore lower cost both to the manufacturer and to the user, and more simple utilization.

This and further objects which will be apparent to the expert of the art are attained by a progressive distributor comprising a one-piece control block which contains three collar pistons floating in relative chambers and ducting for the lubricating fluid, and is removably connectable to a second one-piece block comprising ducts and inlet and outlet ports for distribution purposes only.

The control block comprises three cylindrical chambers disposed at the vertices of an ideal triangle. The flow rates at the individual outlet ports of the distribution block can be varied either by varying the size and configuration of the chambers and pistons, or by excluding one outlet and connecting it to another outlet at the interface between the distribution block and control block.

The highest throughput outlet can be connected to the inlet of a further distribution block pertaining to a subsequent progressive distributor.

The connections between the ducting of the control block and the ducts of the distribution block are made fluid-tight by using O-rings.

One method of varying the throughput per cycle at at least one distribution block outlet, as mentioned heretofore, is to provide at the interface between the two blocks and preferably in the distribution block two ports which are interconnected at the interface but which can be shut off by interposing a seal ring. One of these ports is connected to the outlet at which it is required to increase the quantity delivered per cycle, and the other port is connected to a further outlet which is connected to the end portion of one cylindrical chamber via a further port at the interface. If this second outlet is blocked off, the lubricant fluid is unable to escape from it and so passes to the first through the interconnection between the two initially stated ports, which communicate because the shut-off ring is absent.

BRIEF DESCRIPTION OF THE DRAWINGS

The invention will be more apparent from the accompanying drawings which are provided by way of example and in which:

FIG. 1 is a side view of a distributor according to the invention in its utilization state, with a part shown in section;

FIG. 2 is a front view of the distributor of FIG. 1;

FIG. 3 is a section on the line III—III of FIG. 2;

DETAILED DESCRIPTION OF THE PREFERRED EMBODIMENT

Figure 4:
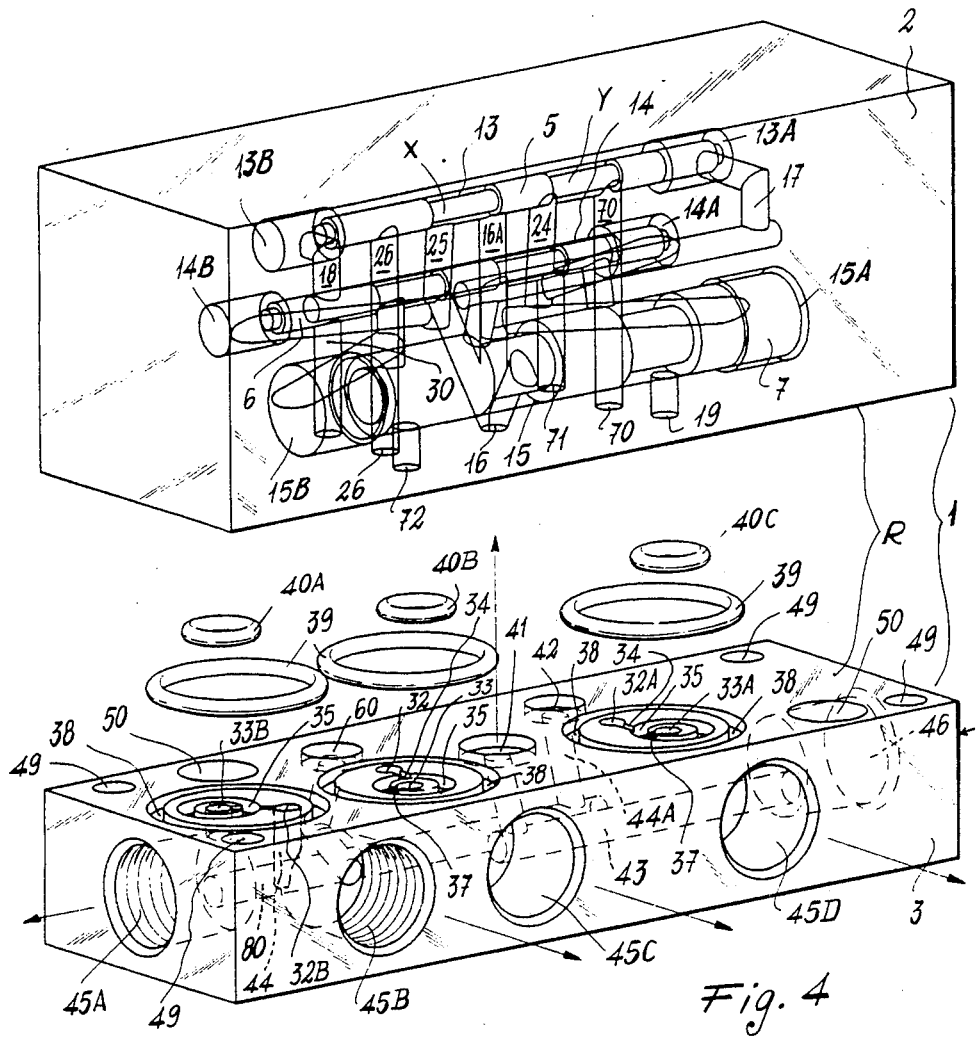
FIG. 4 is an exploded view of the distributor of FIG. 1 with the control block shown transparent.

In the figures, the modular progressive hydraulic distributor for lubrication systems, indicated overall by 1, comprises two parallelpiped blocks 2 and 3, of which that indicated by 2 provides a control function while that indicated by 3 provides only a distribution function. They are removably connected together along an interface R.

The control block 2 comprises internal ducting indicated overall by 4, and three floating collar-type pistons, namely a first 5, and second 6 and a third 7, which are disposed at the vertices of an ideal triangle.

Said pistons comprise two depressed regions X, Y lying between three collars 10A, B, C, 11A, B, C and 12A, B, C.

The pistons 5, 6, 7 move within cylindrical chambers 13, 14, 15 having end sections 13A, 13B; 14A, 14B; 15A, 15B of greater diameter than the remainder of the chamber. The pistons 5, 6, 7 move within said sections by the action of the pressurised lubricant fluid present alternately in said section.

The control block 2 comprises the following ducting (see FIG. 5); a main inlet duct 16 which receives the pressurised lubricant fluid from a suitable known source and conveys it to the various sections 13A, B, 14A, B and 15A, B depending on the piston positions, a duct 17 starting from an intermediate position in the chamber 15 and extending to the end section 13A of the chamber 13, a duct 18 starting from a different intermediate position in the chamber 15 and extending to the other end section 13B of said chamber 13, a duct 19 leading from the interface R to the chamber 15, a duct 70 leading from the interface R to a position in the chamber 13 slightly before the end section 13A, a duct 71 leading from the interface R to a position in the chamber 14 slightly before the end section 14A, a duct 72 leading from the interface R to a position in the chamber 15 in proximity to the section 15B, a duct 26 leading from the interface R to a position in the chamber 13 in proximity to the section 13B, and a duct 30 leading from the interface R to a position in the chamber 14 in proximity to the section 14B.

Three ducts 16A, 22, 23 extend from the main inlet duct 16, the first 16A leading to an intermediate position in the chamber 13, the second 22 leading to an intermediate position in the chamber 15 and the third 23 leading to an intermediate position in the chamber 14. Close to the position in which the duct 16A opens into the chamber 13 there is a duct 24 which terminates in the end 14A of the chamber 14. A duct 25 which opens into the section 14B is connected to the chamber 13 in a position between the ducts 16A and 26.

A duct 28 starts from a position close to the opening of the duct 23 in the chamber 14 and terminates in the end section 15A of the chamber 15 housing the piston 7 which, in this example, has a larger cross-section than the first two, which are of equal cross-section. A duct 29 starts at the end 15B of the chamber 15 and extends to a position in the chamber 14 between the ducts 23 and 30. The mouths of the ducts 30, 26, 72, 16, 71, 70, 19 mate at the interface R respectively with the mouths 60, 32, 33, 41, 42, 32A, 33A of ducts provided in the distribution block 3.

At the interface R of the distribution block 3 there are two ports 33B, 32B. The former is connected to a duct 32C leading to the outlet port 45A and the latter leads to the outlet port 45B through the duct 44, said ports and ducts being provided in the block 3.

The mouth 60 also leads to the outlet port 45B through the duct 44C. The mouths 32, 33 lead to the outlet ports 45F and 45C respectively, and the mouths 41, 42, 32A, 33A lead respectively to the pressurised lubricant fluid inlet port 46 by way of the duct 43, to the outlet port 45A by way of the ducts 44A and 80, and to the outlet port 45E and outlet port 45D.

Each pair of mouths 32B, 33B; 32, 33; 32A, 33A is surrounded by a circular groove or cavity 38 to house an O-ring 39. Furthermore, each mouth 33B, 33 and 33A is surrounded by a smaller-diameter circular groove to house an O-ring 40A, B, C. The mouths of each pair are interconnected by radial grooves 34, 37. The interconnection is interrupted if the O-ring 40A, B, C is used. The O-rings are clamped between the two blocks 2 and 3 when these are connected together. Other O-rings, not shown, are inserted around the other mouths to provide the necessary seal.

The inlet port 46 is connected in a manner not shown to a conventional lubricant fluid pump, also not shown.

All the outlet ports 45A, B, C... and the inlet port 46 are threaded to allow pipes to be connected for conveying the lubricant fluid. A further reason for the threading is to make it possible to close said ports by known threaded plugs (not shown) if a certain outlet is not to be used.

The distribution block 3 is fixed to the control block 2 by screws 47, the distributor 1 being fixed to a machine by screws 48 both cooperating with threaded ports 49, 50 provided in said blocks.

Figure 5:
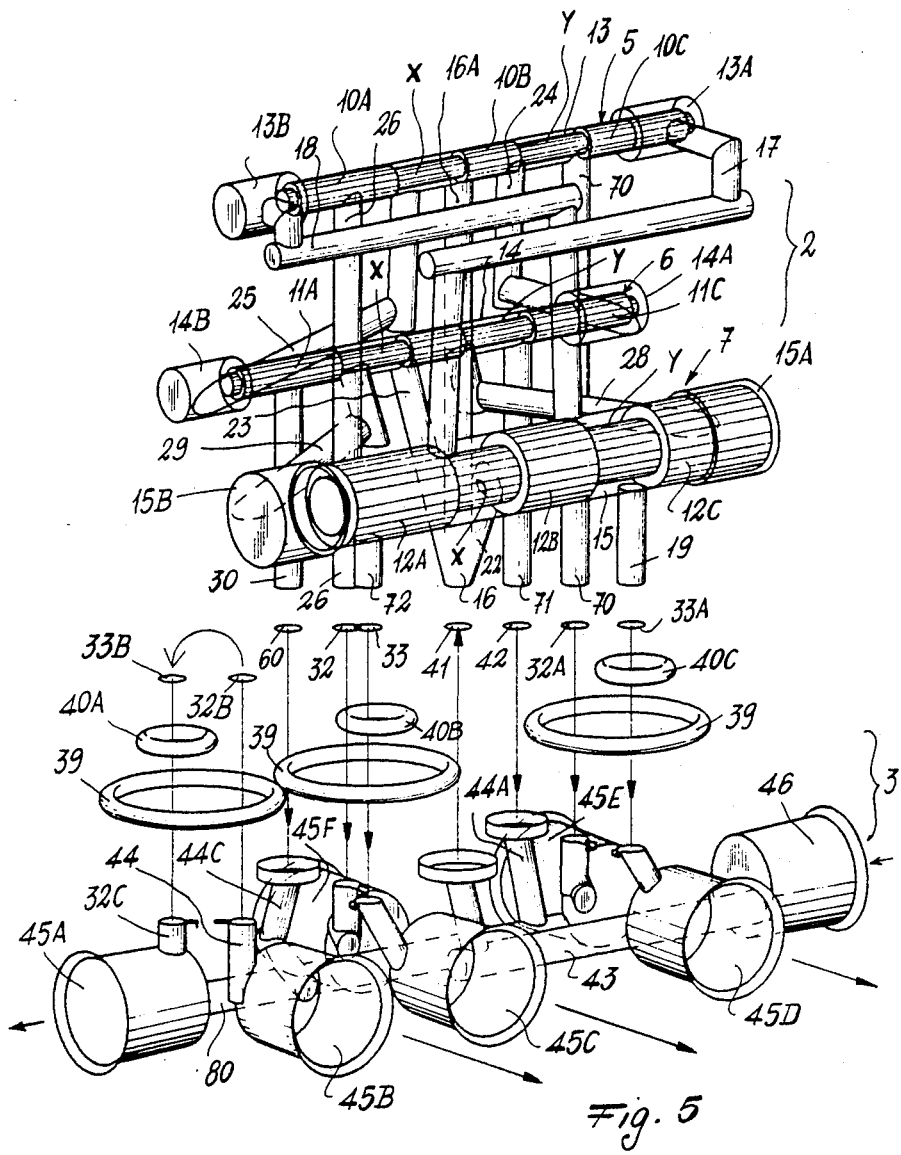
FIG. 5 is a diagrammatic perspective view of the distributor of FIG. 1.

For the description of operation it will be assumed that the distributor is in the position shown in FIG. 5 in which the three pistons 5, 6, 7 are all to the right, the ring 40A is not used and the port 45B is plugged.

It will also be assumed that the end sections 13B, 14B, 15B are full of lubricant. In this situation if lubricant is fed under pressure to the duct 16 through the inlet port, the pressurised fluid enters the duct 16 and then the duct 22 through the depressed portion X of the piston 7, to enter the duct 17 and reach the section 13A of the chamber 13, thus driving the piston 5 to the left. This movement displaces the lubricant from the other end 13B of the chamber 13 into the duct 18, from whence it passes to the depressed region Y of the piston 7 and then through the duct 10 to the mouth 33A and from here to the outlet port 45D. The next fluid to pass through the duct 16 no longer enters the duct 17 because the fluid pressure therein equals the pressure of the fluid passing through the duct 16. It therefore passes into the duct 16A and flows through the depressed region Y of the piston 5 to enter the duct 24, to reach the end 14A of the chamber 14 and displace the second piston 6 towards the left. This movement transfers the lubricant from the chamber 14B to the duct 25 from which it passes through the depression X in the piston 5 and into the duct 26, to reach the mouth 32 and then the outlet port 45F provided on the opposite side of the distributor to the radial outlet port 45D.

Because of the pressure of the fluid already present in the ducts 17 and 24, the next fluid to enter the duct 16 is channelled into the duct 23 and passes through the depression Y in the second piston 6 to enter the duct 28 and reach the end 15A of the chamber 15, thus displacing the third piston 7 towards the left. This movement displaces the lubricant from the end 15B of the chamber 15 into the duct 29, from whence it passes through the depressed region X of the second piston and then through the duct 30 to the mouth 60 and finally to the outlet port 45B, from which however it cannot leave because this is plugged. The fluid therefore passes through the duct 44, the mouth 32B, the radial groove 34, the circular groove 35, the radial groove 37 and the mouth 33B to reach the outside through the port 45A. If however an O-ring 40A is placed in the radial groove 35 between said mouths 32B and 33B, the two mouths are separated, and as the mouth 32B is blocked the only mouth remaining for the fluid is the outlet port 45B, which must therefore be unplugged and connected to a user. In the first case, ie with the O-ring 40A absent, the flow rate from the outlet port 45A is double (per operating cycle) than that which would be obtained with the ring inserted.

As clearly shown in FIG. 4, an analogous flow change can be obtained for the other mouths 32, 33; 32A, 33A.

The aforesaid relates to a first stage in the operating cycle of the distributor 1. In the second stage, the fluid entering the duct 16 from the block 3 displaces the pistons in the opposite direction to the aforesaid, the method in which the operation is effected being however analogous to that described. In this second stage of the cycle, the relevant outlets on the distribution block 3 are the outlet ports 45E and 45C and again the outlet port 45A (it being assumed that the O-ring 40A is not used).

Thus if during the first part of the operation the displacement of the third piston forced fluid from the port 45A, during the complete cycle the amount of fluid passing through said port will be greater than that leaving the other radial outlet ports.

In this manner the outlet port 45A can be used to connect the distributor 1 to a further distributor. The other outlet ports can also be connected to further distributors.

What I claim is:

1. A progressive hydraulic distributor for distributing a pressurized fluid lubricant, comprising:
   (a) a control block having a plurality of cylinders formed therein, and a plurality of consecutively displaceable working pistons, each mounted in a respective cylinder for displacement therein;
   (b) a distribution block on which the control block is mounted at an interface, and having inlet means and outlet means into and from which the lubricant respectively flows;
   (c) control duct means within the control block and extending from the interface to the cylinders, for consecutively conveying the lubricant to the cylinders;
   (d) distribution duct means within the distribution block and extending from the inlet means to the interface, for conveying the lubricant to the control duct means, and also extending from the interface to the outlet means, for conveying the lubricant to the outlet means; and
   (e) flow control means removably mounted at the interface, for controlling the flow of lubricant to the outlet means.

2. The distributor according to claim 1, wherein the control block is a one-piece housing having a first mounting face, and wherein the control duct means has control ports at the first mounting face.

3. The distributor according to claim 1, wherein three cylinders are formed in the block and are arranged at the vertices of a triangle, and wherein three pistons are mounted in the cylinders, each piston having regions of greater diameter and neck regions of lesser diameter.

4. The distributor according to claim 2, wherein the distributor block is a one-piece housing having a second mounting face in contact with the first mounting face, and wherein the distribution duct means has distribution ports at the second mounting face, and wherein the control ports and the distribution ports are in fluid communication with one another.

5. The distributor according to claim 4, wherein the outlet means includes at least two outlets in fluid communication with two of the distribution ports; and wherein the flow control means includes channel means interconnecting said two distribution ports, and seal means removably mounted in the channel means, and operative for preventing lubricant flow past the seal means when the seal means is situated in the channel means, and for enabling lubricant flow between said two distribution ports when the seal means is removed from the channel means.

6. The distributor according to claim 5, wherein said two distribution ports are spaced radially apart at the second mounting face, and wherein the channel means is a groove formed within the second mounting face and extending radially between said two distribution ports, and wherein the seal means is an O-ring mounted within a circular seat surrounding one of said two distribution ports.

7. The distributor according to claim 1, wherein the cylinders and pistons are sized in advance to provide a given lubricant flow rate, and wherein the flow control means is operative to adjust the lubricant flow rate without modification to the blocks.

* * * * *